Feb. 27, 1940.  F. H. HACKER  2,191,757
CALCULATING CALENDAR
Filed Sept. 13, 1938
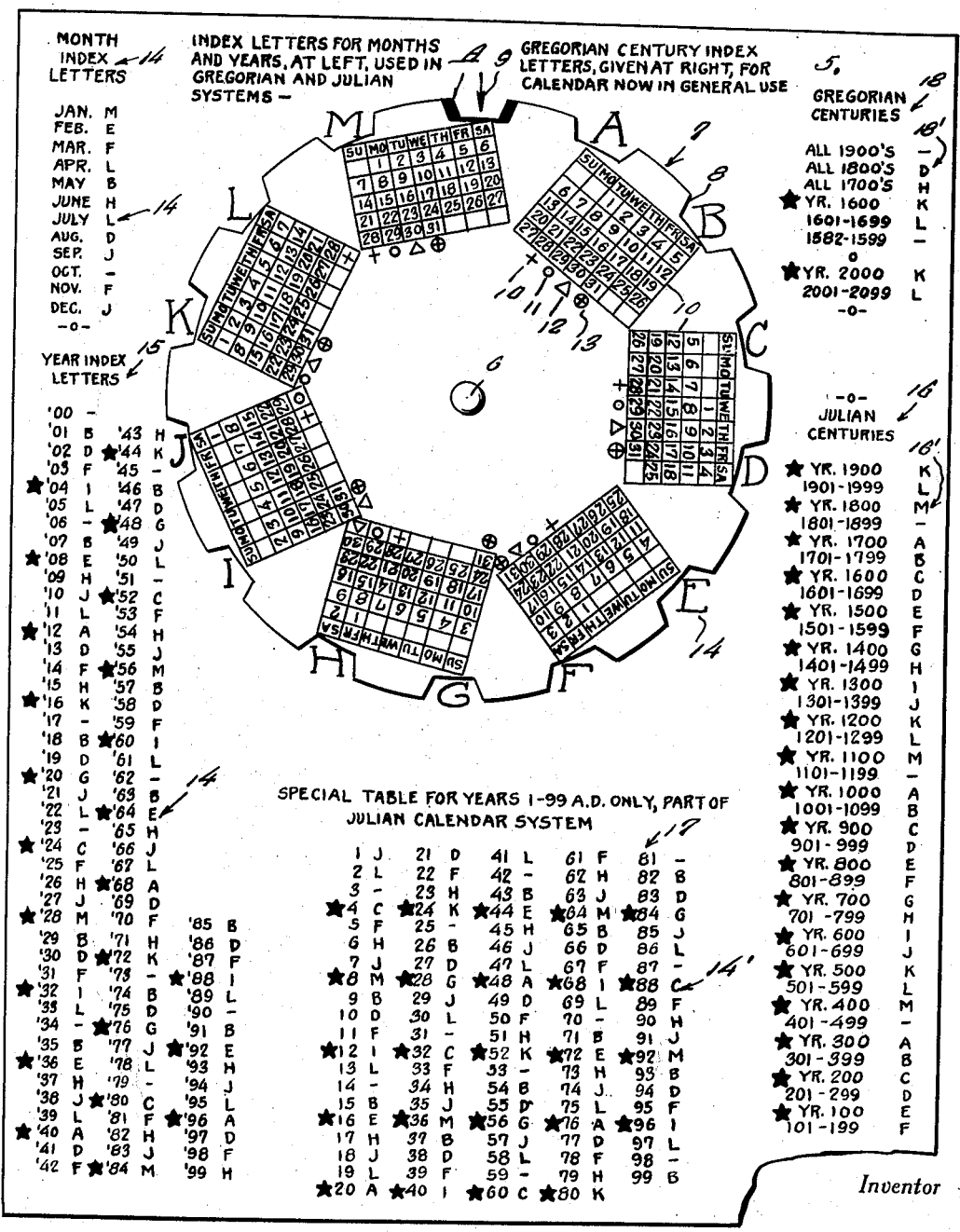
Inventor
F. H. Hacker
By Clarence A. O'Brien
and Hyman Berman
Attorneys Patented Feb. 27, 1940

2,191,757

UNITED STATES PATENT OFFICE 2,191,757

CALCULATING CALENDAR

Francis H. Hacker, Nutley, N. J.

Application September 13, 1938, Serial No. 229,797

5 Claims. (Cl. 40—113)

This invention relates to a calendar and more particularly to a calculating device, and has for the primary object the provision of a device of the above stated character which will permit a person to easily, quickly and accurately determine the days of the weeks for dates in history or the like and also may be employed for determining the days of weeks in the future and further provides the user with a calendar for the entire month involved so that the user may have all the advantages of any ordinary calendar and which will be simple, compact and durable and may be manufactured and sold at a low cost.

With these and other objects in view, the invention consists in certain novel features of construction, combination and arrangement of parts to be hereinafter more fully described and claimed.

For a complete understanding of my invention, reference is to be had to the following description and accompanying drawing, in which The figure is a plan view, illustrating the calculating device constructed in accordance with my invention.

Referring in detail to the drawing, the numeral 5 indicates a card of rigid or semi-rigid material on which is pivoted, as shown at 6, a disc 7 having a selected number of notches 8 in the periphery thereof, one of which is provided with a distinguishing border indicated by the character A, which must be positioned directly under an indicating marking or arrow 9 arranged on the card near the periphery of the disc and adjacent the upper edge of said card when starting a calculation.

Printed or otherwise applied on the disc and grouped in a circular manner are monthly calendars, seven all told, and reading from Sunday to Saturday, inclusive, and from one to thirty-one for the number of days as clearly shown in the drawing. Each calendar is also provided with indicia designated by the numerals 10, 11, 12 and 13. The indicia 10 is in the form of a cross and is located under the number 28 of the calendars, each calendar being thus marked. The indicia 11 is in the form of a circle placed under the numbers 29 on the calendars. The indicia 12 is in the form of a triangle and is placed under the numbers 30 of the calendars. The indicia 13 is in the form of a cross surrounded by a circle and located under the numbers 31 on the calendars. The indicia 10 in the form of a cross indicates the final day of the month of February, except in leap years which are indicated by indicia in the form of stars located on tables which will be hereinafter more fully described. The indicia in the form of the circle indicates the final day in the month of February in leap years. The indicia 12 in the form of a triangle represents the final day in the month of September, April, June and November. The indicia 13 in the form of a cross surrounded by a circle represents the final day of all other months, i. e., January, March, May, July, August, October and December.

On one corner of the card 5 is the listing of the months of the year with each month given an index letter or character 14, such as M, E, F, L, B, H, L, D, J,—F, J, as clearly shown in the drawing. Like letters or characters 14 are arranged on the card 5 circumferentially of the disc 7 to indicate positions to be occupied by the disc simply by aligning the notches 8 with the character selected.

Arranged on the card 5 directly under the month index letters is a table 15 bearing the title "Year index letters." This table 15 reads from 00 to 99. Said listing of numbers in the index 15 is for years used in the Gregorian and Julian systems as indicated by the headings at the upper portion of the card 5 and to the left thereof, as clearly shown in the drawing. The letters given in the index 15 are for the respective years which they follow, each leap year being indicated by a symbol in the form of a star.

Arranged on the opposite side of the card 5 from the index 15 is an index 16 representing the Julian centuries reading from the year 100 to 1999. This index is readable from the lower end towards the upper end and it is to be noted that the years are grouped such as from 101 to 199. Also it is to be noted that the index 16 opposite to the groups of years listed therein are given the letter characters 16' denoting the portions of the centuries under the Julian calendar system. Further, it is to be noted that in the index 16 is given the heading "Julian centuries."

Arranged on the card 5 between the index tables 15 and 16 and below the disc 7 is a table or index 17 known as a special table for years from 1 to 99 A. D., only, part of the Julian calendar system. It is to be noted that the numerals representing the years in the table 17 extend from 1 to 99 and have arranged opposite thereto in a certain manner, as shown in the drawing, the index letter characters 14' to be used in the calendar calculations involving this particular group of years so that calculations may be made further back than the year 100 A. D.

In the upper right hand corner of the card 5 is a table or index 18 under the heading Gregorian centuries and reading 1900, 1800, 1700, year 1600 with the symbol in the form of a star opposite thereto, 1601–1699, 1582–1599, year 2000, year 2001 to 2099. Arranged on this table 18 are the index letters 18' to be used in calculations involving the centuries or parts of centuries and are like the characters arranged on the card 5 about the disc 7. The index letters of the tables are measurements of spaces the disc is to be moved in order that the proper calendar is brought into reading position. Also arranged on the card adjacent the table or index 18 is a heading which is as follows: "Gregorian century index letters, given at right for calendar now in general use."

The Gregorian calendar was introduced by Pope Gregory, XIII, in 1582, to supersede the Julian calendar. By the terms of the Pope's brief, ten days were to be dropped after Thursday, October 4, 1582, of the Julian calendar, and the next day, the first of the Gregorian, was to be October 15, 1582. This day took the week day Friday instead of Monday, on which the date would have fallen under the original Julian calendar for the month. Thus the order of days of the week underwent no interruption when the calendar was changed.

The new calendar was not immediately adopted in all places. France adopted the change in December, making Monday, December 20, 1582, of the Gregorian system, come immediately after Sunday, December 9, of the Julian calendar. Certain countries continued the use of the Julian system into the present century. In using the calculating device to determine days of the week for dates in history, it is necessary to bear these facts in mind, remembering that the Gregorian system was nowhere in use until October 15, 1582.

In order to calculate further back than the year 100 A. D., a special table is required, and this is indicated by the character 17. To find month calendars in these years, a maximum of two operations is required, the movement for the month and that for the year, no century calculation being involved. Thus in order to find the calendar for January of the year 1, we make the movements M and J. We note that January 1, 1 A. D., fell on Saturday.

In the following will be given a brief description of directions of operations for use in making calculations by this device.

To find the calendar for any month, beginning with January of the year 1 A. D., first be sure that the calculating disc is in the proper starting position. In this position, the notch indicated by the border A is directly beneath the arrow 9. All calculations must start in this manner.

If, for example, you wish to see the calendar for January of 1939, it is only necessary to bear in mind the three parts of the date, month, (January), century (19—), and year (—39). Noting in the month table, in the upper left hand corner of the card 5, that M is the index letter for January, insert finger in the calculating disc notch at M, moving this notch into position directly beneath the arrow 9. The next part of the date is the century and a glance at the century table 18, in the upper right hand corner of the card 5, shows that the 1900's have no index letter. Therefore, no move is made for the century in this or any other date of the 1900's.

The final part of the date is the year (—39). Note in the year table, indicated by the character 15, that L is the index letter for '39. Then move the disc notch at L into the position beneath the arrow. When this operation has been completed, the full calendar for the month of January, 1939, with days of week and month dates indicated, is in position. It will be noted that the first day of the year is Sunday and further it will be noted that the dates upon which any day of the week falls in the month, or the day of the week for any date, will be indicated just as with any ordinary calendar.

In using this device, one caution must be taken, that is, in some instances the 1600's for example, you will note the index letter K, in this case, given for the first year of the century is different from the index letter for the rest of the century (L for 1601–1699). Avoid getting the letters confused and the correct calendars will always be quickly and easily found. Also caution must be taken to bear in mind that no disc movement, whether of month, century or year is made where a dash is shown on the tables. For example, if the calendar for October, 1934, is desired, the disc is left at the starting position, the calendar being already in position beneath the arrow 9.

A glance at the tables will show that the centuries are divided into the two classifications, the Gregorian, in the upper right hand corner of the card 5, the century system for the calendar now in general use, and the Julian centuries, given below the Gregorian.

In the calendar for future centuries, it will be noted in the table for the centuries of the Gregorian calendar that the formula is K—L, H, D, —, repeated in sequence corresponding with the centuries in numerical order. K is the index letter for the first years (those ending in 00) of the fourth centuries (those which, with the last two numerals eliminated, are exactly divisible by 4) such as example 1600's, 2000's, 2400's, 2800's, etc., and L is the letter for the remaining portions of these centuries. The index letters H, D, —, follow in sequence with the other centuries. This formula holds good indefinitely under the Gregorian system, except that for 4000 and its multiples, as 8000, 16000, etc., the index letter L must be used throughout. The tables for months and years continue unchanged, under either the Gregorian or Julian systems.

Assuming survival of the Julian calendar in any place in the future, month calendars in future centuries could very readily be found under this system also, by applying the formula for Julian centuries. This formula in its sequence with the advancing centuries is, E—F, C—D, A—B, M——, K—L, I—J, G—H, repeating itself with each seven-century period. The first letters in the series of pairs, E, C, A, M, K, I and G are for the years ending in 00. The other designations in the order given: F, D, B, — etc., are for the other portions of the centuries in numerical sequence.

It is to be noted that in the Gregorian calendar, leap years do not occur at the beginning of every century, (years ending 00) as is the case in the Julian system. In the Gregorian calendar the year 1600 was a leap year. The years 2000 and 2400 will also be leap years. The '00 years between these dates are not leap years. But aside from irregularity in the '00 years, leap year occurs in the fourth years under both the Gregorian and the Julian systems.

It is believed that the foregoing description, when taken in connection with the drawing, will fully set forth the construction and advantages of this invention to those skilled in the art to which such a device relates, so that further detailed description will not be required.

What is claimed is:

1. A calculating device comprising a panel having applied thereto a month table, two century tables, and two year tables and each including like index symbols, a disc journaled on the panel and provided with spaced notches and having applied thereto a selected number of monthly calendars adapted to be brought into a determined reading position on the panel by information obtained from said tables to find the day of the week for any date in the past and in the future and to provide a calendar for the entire month involved, said panel having a symbol for a determined reading position and one of said notches having distinguishing marking to be brought opposite said last-named symbol when starting a calculation with said disc, said panel having index symbols corresponding to the index symbols of the tables and arranged about the disc for permitting a person to determine the distance the disc must be rotated to bring the proper calendar to the reading position on the panel.

2. A calculating device comprising a panel having applied thereto a month table, two century tables, and two year tables and each including like index symbols, a disc journaled on the panel and provided with spaced peripheral notches and having applied thereto adjacent said notches a selected number of monthly calendars adapted to be brought into a determined reading position on the panel by information obtained from said tables to find the day of the week for any date in the past and in the future and to provide a calendar for the entire month involved, said panel having a symbol designating the determined reading position and one of said notches having a distinguishing marking adapted to be moved opposite said last-named symbol when starting a calculation, said panel having index symbols corresponding to the index symbols of the tables and arranged circumferentially about the disc and viewable through the notches of the disc for permitting a person to determine the distance the disc must be rotated to bring the proper calendar to the reading position.

3. A calculating device comprising a panel having applied thereto a month table, two century tables, and two year tables and each including like index symbols, a disc journaled on the panel and provided with spaced peripheral notches and having applied thereto adjacent said notches a selected number of monthly calendars adapted to be brought into a determined reading position on the panel by information obtained from said tables to find the day of the week for any date in the past and in the future and to provide a calendar for the entire month involved, said panel having a symbol designating the determined reading position and one of said notches being of a distinguishing character and adapted to be positioned over said last-named symbol when starting a calculation, said panel having index symbols corresponding to the index symbols of the tables and arranged circumferentially about the disc and viewable through the notches of the disc for permitting a person to determine the distance the disc must be rotated to bring the proper calendar to the reading position, said calendars of the disc each having a symbol to indicate termination of February in leap years and the tables having symbols for indicating leap years.

4. A calculating device comprising a panel having applied thereto a month table, two century tables, and two year tables and each including like index symbols, a disc journaled on the panel and provided with spaced peripheral notches and having applied thereto adjacent said notches a selected number of monthly calendars adapted to be brought into a determined reading position on the panel by information obtained from said tables to find the day of the week for any date in the past and in the future and to provide a calendar for the entire month involved, said panel having a symbol designating the determined reading position and one of said notches being of a distinguishing character and adapted to be positioned over said last-named symbol when starting a calculation, said panel having index symbols corresponding to the index symbols of the tables and arranged circumferentially about the disc and viewable through the notches of the disc for permitting a person to determine the distance the disc must be rotated to bring the proper calendar to the reading position, said calendars of the disc each having a symbol to indicate termination of February in leap years and the tables having symbols for indicating leap years, said century tables including the Gregorian and Julian systems.

5. A calculating device comprising a panel having applied thereto a month table, two century tables and two year tables and each including like index symbols, a disc journaled on the panel and provided with spaced peripheral notches and having applied thereto adjacent said notches a selected number of monthly calendars adapted to be brought into a determined reading position on the panel by information obtained from said tables to find the day of the week for any date in the past and in the future and to provide a calendar for the entire month involved, said panel having a symbol designating the determined reading position and one of said notches being of a distinguishing character and adapted to be positioned over said last-named symbol when starting a calculation, said panel having index symbols corresponding to the index symbols of the tables and arranged circumferentially about the disc and viewable through the notches of the disc for permitting a person to determine the distance the disc must be rotated to bring the proper calendar to the reading position, said calendars of the disc each having a symbol to indicate termination of February in leap years and the tables having symbols for indicating leap years, said century table including the Gregorian and Julian systems, said panel having a special table including symbols matching the symbols of the month table and forming a part of the Julian calendar system.

FRANCIS H. HACKER.